United States Patent [19]

Langer, Jr. et al.

[11] E Re. 28,456

[45] Reissued July 1, 1975

[54] INORGANIC LITHIUM AMINE COMPLEXES

[75] Inventors: Arthur W. Langer, Jr., Watchung; Thomas A. Whitney, Roselle, both of N.J.

[73] Assignee: Exxon Research & Engineering Co., Linden, N.J.

[22] Filed: Jan. 4, 1974

[21] Appl. No.: 430,770

Related U.S. Patent Documents

Reissue of:

[64] Patent No.: 3,734,963
Issued: May 22, 1973
Appl. No.: 808,328
Filed: Mar. 18, 1969

[52] U.S. Cl. ..... 260/563 R; 252/49.7; 260/239 E; 260/247; 260/268 R; 260/293; 260/349; 260/429 J; 260/429.1; 260/429.5; 260/429.7; 260/430; 260/431; 260/439 R; 260/440; 260/448 A; 260/570.5 P; 260/577; 260/583 R; 260/583 D; 260/583 P; 260/584 C; 260/606.5 P; 260/607 A; 260/609 R; 260/609 E; 260/638 B; 260/651 HA

[51] Int. Cl... C07c 87/14; C07c 87/20; C07c 87/38

[58] Field of Search..... 260/563 R, 583 R, 583 P

[56] References Cited

UNITED STATES PATENTS

| | | | |
|---|---|---|---|
| 2,867,498 | 1/1959 | Roscoe et al. | 260/583 R X |
| 3,258,490 | 6/1966 | Bedell | 260/583 P |
| 3,347,893 | 10/1967 | Hogsett et al. | 260/583 R X |
| 3,663,585 | 5/1972 | Langer | 260/563 R X |
| 3,737,458 | 6/1973 | Langer | 260/563 R X |
| 3,758,585 | 9/1973 | Bunting | 260/583 P |
| 3,769,345 | 10/1973 | Langer | 260/563 R |
| 3,806,520 | 4/1974 | Haar | 260/563 R X |
| 3,808,207 | 4/1974 | Shepherd et al. | 260/563 R X |

*Primary Examiner*—Paul F. Shaver
*Attorney, Agent, or Firm*—John P. Corcoran

[57] ABSTRACT

Complexed inorganic lithium salts are prepared by mixing an inorganic lithium salt such as a lithium halide with a monomeric or polymeric organic complexing agent which contains at least one nitrogen atom and at least one other atom which is nitrogen, oxygen, phosphorus or sulfur. The complexing agent may be nonchelating (e.g. triethylenediamine) or chelating in nature. The chelating complexing agents (e.g. triamines such as pentamethyl diethylenetriamine) are preferred. The resultant complex is useful for a variety of processes such as separations, catalytic reactions, substitution reactions, electrochemical reactions, etc. and as oil and fuel additives.

11 Claims, No Drawings

INORGANIC LITHIUM AMINE COMPLEXES

Matter enclosed in heavy brackets [ ] appears in the original patent but forms no part of this reissue specification; matter printed in italics indicates the additions made by reissue.

THE PRIOR ART

It is well known (e.g. see British Pat. 1,051,269) that organolithiums such as n-butyllithium will form chelate complexes with certain bifunctional Lewis bases, particularly di-tertiary amines such as tetramethylethanediamine. According to this patent, the compelxes are prepared by mixing the organolithium and the di-tertiary diamine, generally in the presence of a hydrocarbon solvent or excess amounts of the diamine. The chelate complex forms quite rapidly since the organolithium and the diamine form a homogeneous solution (in a hydrocarbon or excess diamine) and the chelate complex may then be isolated by removal of the diluent.

It is also well known (e.g. see British Pat. 1,031,179) that alkali metals such as sodium or lithium in finely divided form can be reacted with certain organic compounds to produce the corresponding organo alkali metal salts, providing the reaction is carried out in the presence of certain amines in which at least one of the amino groups is a primary or secondary amine group. Thus, a lithium dispersion (in heptane) can upon admixture with ethylenediamine, yield N-lithioethylenediamine; this latter matter upon treatment with acetylene will yield monolithium acetylide ethylenediamine.

It is also well known (U.S. Pat. 2,726,138) that lithium chloride may be extracted from crude aqueous lithium chloride with the aid of an inert solvent of 3 to 8 carbon atoms containing at least one nitrogen or oxygen atom such as the alkanols, corresponding ketones and aldehydes, pyridine and quinoline.

THE PRESENT INVENTION

It has now been unexpectedly discovered that a complex of certain inorganic lithium salts and certain complexing agents can be readily prepared. This is highly surprising for the various reasons set forth immediately below.

At the outset, it was surprising that a complex of an inorganic lithium salt could be prepared since the general chemistry (i.e. properties, reactivity, etc.) of inorganic lithium salts differ drastically from that of organolithium compounds or lithium metal. Many organolthium compounds are generally soluble in hydrocarbons and thus readily form complexes upon admixture with certain complexing agents. However, inorganic lithium salts are generally insoluble in hydrocarbons; thus, it was wholly unexpected to find that when many inorganic lithium salts were mixed with a hydrocarbon containing the complexing agent, the inorganic lithium salts dissolved in the reaction medium and stable complexes of the chelating agent with the lithium salt could be obtained from the reaction mixture.

It is well known that one of the significant factors used in predicting whether a reaction can be accomplished with a given material is whether the lattice energy of such material is low enough to be overcome by the other reactant so as to form a new compound. Thus, it was highly surprising to find that the inorganic lithium salts which have significantly higher lattice energies than those of organolithium compounds, nevertheless can form complexes with the same type (and indeed many more types) of complexing agent as those used in conjunction with the organolithium compounds.

Finally, it was unexpected to find that inorganic salts of alkali metals other than lithium (i.e. sodium, potassium, cesium and rubidium) did not form stable complexes with the same complexing agents, although the general chemistry of such inorganic alkali metal salts is very similar to that of the inorganic lithium metal salts.

The inorganic lithium salt

The first component of the novel complexed inorganic lithium salts of this invention is an inorganic lithium salt having a lattice energy no greater than about that of lithium hydride, preferably no greater than about 210 kilocalories per mole (measured at about 18°C.). The lattice energies of various inorganic lithium salts may be found in the "Handbook of Electrochemical Constants" by Roger Parsons (Academic Press, 1959).

The lithium salts useful for this invention must have less than the requisite maximum lattice energy and must also be inorganic in nature; they will normally have melting points less than about 650°C. The term "inorganic," for the purposes of this invention, means that (1) there is no hydrocarbon radical bonded directly to the lithium atom and (2) any hydrocarbon radical present in the anion moiety must be indirectly bonded to the lithium through a third atom which cannot be nitrogen, oxygen, phosphorus or sulfur. Thus, lithium compounds such as n-butyllithium and phenyllithium do not meet criteria (1) and are outside the scope of this invention. Similarly, compounds of the type LiOR, LiNHR or $LiNR_2$, LiSR, $LiPR_2$, LiOOCR do not meet criteria (2) and are therefore outside the scope of this invention. On the other hand, compounds of the type $LiNH_2$, LiCN, LiSCN, LiSH, $Li_2CO_3$, $LiHCO_3$, $LiAlR_2Cl_2$, $LiAlH(OR)_3$, $LiBH(OR_3)$, $LiAlR_3H$, etc. are within the scope of this invention.

Specific nonlimiting examples of useful inorganic lithium salts are those in which the anion is: amide, azide, bicarbonate, chlorate, cyanide, fluosulfonate, chloride, bromide or iodide, hydrogen sulfate, hydrosulfide, iodate, nitrate, hypochlorite, nitrite, sulfate, thiocyanate, perchlorate, $Br_3$, $I_3$, $ClBr_2$, $IBr_2$, $ICl_4$, $BrF_4$, $IF_6$, etc.

Also useful are those inorganic lithium salts in which the anion is a complex metal anion which may be represented by the formula $R''_nMX_m$ wherein n is an integer of 0 to 6 inclusive depending on the valence of M, m is an integer and (n+m−1) equals the valence of M, X is a halogen, R'' is a $C_1$–$C_{20}$ alkyl, aryl or aralkyl radical and M is a metal selected from the group consisting of beryllium; magnesium; Group 1b elements; Group 2b elements; Group 3 elements, Group 4a elements other than carbon and silicon; Group 5a elements other than nitrogen; and the transition metals, i.e. subgroup b of Groups 4 through 8. The Periodic Table employed in describing this invention is that which appears on the back cover of "Handbook of Chemistry and Physics" (Chemical Rubber Co., 49th edition).

Nonlimited examples of useful complex metal anions include the hydridoaluminates, the hydridoborates, the chloroaluminates (tetra-, hepta-, etc.), the aluminum alkyl halides, $AuBr_4$, $BF_4$, $BeCl_4$, $SnCl_6$, $PF_6$, $TiCl_6$, $FeCl_4$, $Cr(CO)_5I_4$, $MnCl_3$, $Ni(CN)_4$, $VF_6$, $HgCl_3$, $B_2H_7$, $UF_4$, $AsF_6$, etc.

Preferably, the inorganic lithium salt is one of the following: lithium chloride, lithium bromide, lithium iodide, lithium aluminum hydride, lithium borohydride, lithium [,] nitrate, lithium hexafluorophosphate, lithium tetrafluoroborate, lithium tetraphenylborate, $LiAl(C_2H_5)H_3$, $LiAl(C_2H_5)_2H_2$, $LiAl(C_2H_5)_3H$, $LiAl(C_2H_5)_4$, lithium perchlorate, lithium azide, $LiAsF_6$ and $Li_2BeF_4$.

The complexing agent

The complexing agent contains at least two functionalities: at least one functionality is a secondary amine group, a tertiary amine group, an amine oxide group, a secondary phosphine group, a thioether group, a sulfone group or a sulfoxide group; at least one other functionality is a secondary amine group, a tertiary amine group, an amine oxide group, a secondary phosphine group, a tertiary phosphine group, a phosphine oxide group, a thioether group, a sulfone group, a sulfoxide group or an ether group.

The terms "amine oxide group" and "phosphine oxide group," for the purposes of this invention mean that the underlying amine and phosphine must be tertiary (rather than primary or secondary) in nature. Thus, the desired "amine oxide group" and "phosphine oxide group" have the formulas:

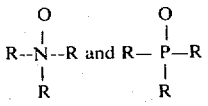

The oxides of primary or secondary amines or phosphines either do not exist or are unstable and undergo rearrangement, e.g.

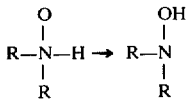

The complexing agent may be non-chelating or chelating in nature; the chelating type (preferred herein) have one required functionality in a spatial relationship with the other required functionality(ies) in the molecule such that co-ordinate bonds are established between the functionalities and the lithium cation of the inorganic lithium salt.

Suitable, nonlimiting examples of nonchelating complexing agents are:

Amines such as triethylenediamine, tetramethyl-1,6-hexanediamine, N,N'-dimethylpiperazine, tetramethyl-1,5-pentanediamine, tetramethyl-1,10-decanediamine, etc.;

Aminoethers such as N-methyl morpholine, 6-(dimethylamino)-hexyl methyl ether, etc.; and Amine oxides such as N,N,N',N'-tetramethyl-1,6-hexanediamine dioxide, triethylenediamine dioxide, etc.

The chelating type of complexing agent may be sparteine, an N,N'-di-($C_1$-$C_4$ alkyl) bispidin, tris-2(dimethylaminoethyl)-amine as well as those compounds falling within the scope of the following general formulas:

(I)

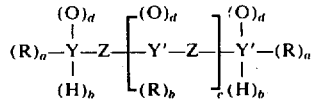

(II)

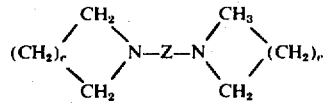

(III)

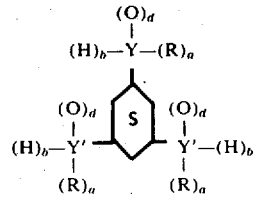

(IV)

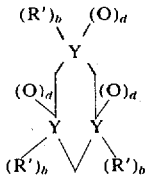

wherein a is 1 or 2, depending on the valence of Y or Y', b is 0 or 1, depending on the valence of [L] Y or Y'; c is an integer of 0 to 10,000, inclusive, d is 0, 1 or 2, depending on the valence of Y or Y'; e is an integer of 0 to 3, inclusive; R is the same or different $C_1$–$C_4$ alkyl radical; R' is hydrogen when d is 0 or is the same or different $C_1$–$C_4$ alkyl radical or $C_6$–$C_{10}$ aryl or aralkyl radical when d is 0, 1 or 2; Y is a nitrogen, sulfur or phosphorus atom; Y' is a nitrogen, oxygen, sulfur or phosphorus atom; and Z is a nonreactive radical selected from the group consisting of (1) $C_4$–$C_{10}$ cycloaliphatic or aromatic radicals and their lower lakyl derivatives wherein said radicals are attached to the Y and Y' atoms in Formula I and the nitrogen atoms in Formula II at 1,2-positions on the aromatic rings or 1,2- or 1,3-positions on the cycloaliphatic rings; and (2) 1 to 4 methylenic radicals, wherein each methylenic radical contains 0 to 2 monovalent hydrocarbon radicals of 1 to 6 carbon atoms.

Preferably, the chelating Lewis base has (a) at least one Y being nitrogen and at least one Y' being oxygen (i.e., an aminoether) or (b) all the Y and Y' atoms being the same atom (i.e., polyamines, polyamine oxides, polyphosphines, polyphosphine oxides, polythioethers, polysulfones and polysulfoxides). It should be understood that the prefix "poly-" employed in describing the non-chelating and chelating Lewis bases means that the Lewis base is a monomer or a polymer in the classical sense and that such monomer or polymer has two or more of the same functionalities.

Suitable nonlimiting examples of chelating Lewis bases falling within the scope of the above formulas are:

Formula I (where all heteroatoms are nitrogen atoms):

N,N,N',N'-tetramethyl-1,2-cyclopentanediamine,

N,N,N',N'-tetramethyl-1,2-cyclohexanediamine (cis, trans or mixtures),
N,N,N',N'-tetramethyl-o-phenylenediamine,
4-ethyl-N,N,N',N'-tetramethyl-o-phenylenediamine,
N,N,N'',N''-tetramethyl-N'-phenyl diethylenetriamine,
N,N,N',N'-tetramethyl-1,2-ethanediamine,
N,N,N',N'-tetramethyl-1,3-propanediamine,
N,N,N',N'',N''-pentamethyl-diethylenetriamine,
N,N,N',N'-tetramethyl-1,2-propanediamine,
N,N,N',N'-tetramethyl-1-cyclohexyl-1,2-ethanediamine,
N,N,N',N'-tetramethyl-2,3-butanediamine,
N,N,N',N'-tetramethyl-1,4-butanediamine,
N,N,N',N'',N''',N'''-hexamethyl triethylenetetramine,
poly-(N-ethyl-ethyleneimine),
poly-(N-methyl ethyleneimine),
N,N,N',N'-1,8-naphthylenediamine;
beta-(dimethylamino)-ethyl methyl ether,
beta-diethylaminoethyl ethyl ether,
bis-($\beta$-dimethylaminoethyl) ether,
beta-(dimethylamino)-ethyl ethyl ether,
gamma-(dimethylamino)-propyl methyl ether,
ortho-dimethylamino anisole;
1-dimethylamino-2-dimethylphosphino ethane,
bis(beta-dimethylaminoethyl) methyl phosphine;
beta-(dimethylaminoethyl) methyl sulfide;
1,2-dipiperidylethane;
tris-(1,3,5-dimethylamino) cyclohexane;
N,N',N''-trimethyl-1,3,5-hexahydrotriazine;
tetramethylethylenediamine dioxide,
tetramethylmethanediamine dioxide;
tretramethylethylenediphosphine dioxide;
2,5-dithiahexane-2,5-disulfone; and
2,5-dithiahexane 2,5-disulfoxide, etc.

The chelating type of complexing agent is preferred over the non-chelating type of chelating agent since the former results in more stable complexed inorganic lithium salts. Particularly preferred, since they generally give rise to hydrocarbon-soluble complexes, are those chelating Lewis bases wich are (1) tertiary polyamines (i.e. all of the heteroatoms are teriary nitrogen atoms) containing at least 5 carbon atoms and at least 2 tertiary nitrogen atoms and (2) tertiary aminoethers (i.e. all nitrogen atoms present are tertiary nitrogen atoms) containing at least 5 carbon atoms and at least 1 tertiary nitrogen atom and at least one ether group. Particularly preferred species of the chelating tertiary polyamines are N,N,N',N'-tetramethyl-1,2-ethanediamine,
N,N,N',N'-tetramethyl-1,3-propanediamine,
N,N,N',N'-tetramethyl-1,2-cyclohexanediamine (cis, trans or mixtures),
N,N,N',N'',N''-pentamethyl diethylenetriamine,
N,N,N',N'',N''',N'''-hexamethyl triethylenetetramine,
poly-(N-methyl ethyleneimine), etc. Particularly preferred species of the tertiary aminoethers is beta-(dimethylamino)-ethyl methyl ether.

The complex of the inorganic lithium salt (with the non-chelating or chelating complexing agent) may be readily prepared by mixing the selected inorganic lithium salt (having the requisite maximum lattice energy) with the selected complexing agent in the absence of solvent. Such mixing may also be accomplished in the presence of inert hydrocarbons, e.g. $C_4$–$C_{20}$ alkanes (e.g. pentane, heptane, hexadecane); $C_6$–$C_{20}$ aromatics (e.g. benzene, toluene, xylene, dibutylnapthalene); halogenated aromatics (e.g. chlorobenzene, dichlorobenzene, hexafluorobenzene); heterocyclic compounds (e.g. pyridine, pyrrole, furan, thiophene, sulfolane, borazole; polar solvents (e.g. alcohols, ketones, dimethylsulfoxide, acetonitrile, dimethylformamide, liquid ammonia, triethylamine, propylene carbonate, ethers, etc.); or mixtures thereof.

The amount of the diluent is not critical and amounts in the range of 0 to 99.9 wt. percent, based on the chelated lithium salt may be conveniently employed. Thus, the complex can be prepared in the absence of solvents, in the form of pastes and in solutions.

In those situations where the inorganic lithium salt of choice is not solubilized by the admixture of the complexing agent and solvent, the complex may be formed by mixing the inorganic lithium salt (which is preferably in finely divided form) with the complexing agent of choice in stoichiometric amounts, or preferably, with excess complexing agent.

Another method for preparing the complex involves anion exchange. In this method, the complexing agent of choice is mixed with an inorganic lithium salt (in which the anion is not the desired anion) by one of the methods described above. Thereafter the resultant complex is subjected to anion exchange in the presence of a metal salt (or other well known techniques such as anion exchange resins) containing the anion of choice; alternatively, all components may be mixed simultaneously and both complexation and metathesis occurs in situ.

Another method for preparing the complex is analogous to the preceding method except that here the anion is one of choice, but the complexing agent is not one of choice. After preparing the non-preferred complex by one of the above methods, the non-preferred complexing agent moiety is exchanged for the preferred complexing agent moiety by mixing the complex (utilizing one of the former methods) with the desired complexing agent and thereafter recovering the desired complex.

Regardless of the method employed the preparation of the complex is preferably carried out under anhydrous conditions, although this not not always necessary in some applications, such as separations.

The complex may be readily prepared at temperatures of about −50° to about 200°C.; preferably 0 to 100° C.; the latter temperature range is preferred because of convenience and also since higher temperatures favor dissociation of the less stable complexes. In general, from 0.25 to 50, preferably 0.5–10, moles of complexing agent per mole of inorganic lithium salt is employed; the complexing agent may also be employed as a solvent. However, it should be understood that the amount of complexing agent employed may influence the structure of the resultant complex. Thus, it has been found possible to prepare complexes of the following types:

(1) Two moles of inorganic lithium salt to one mole of complexing agent such as $(LiBr)_2$ ·hexamethyl triethylenetetramine.

(2) One mole of inorganic lithium salt to one mole of complexing agent, such as LiBr·pentamethyl diethylenetriamine, LiI·tetramethyl ethanediamine.

(3) One mole of inorganic lithium salt to two moles of complexing agent, such as $LiAlH_4 \cdot 2$(tetramethyl ethanediamine), $LiAlH_4 \cdot 2$(tetramethyl methanediamine), $LiBr \cdot 2$(tetramethyl ethanediamine), Of course, the minimum amount of complexing agent should be that stoichiometric amount required to produce the desired type of complex (where more than one type of complex is possible from a particular inorganic lithium salt and a particular complexing agent). Where only one type of complex can be formed or where one is not concerned with the particular type of complex to be formed (assuming more than one type is possible), it is desirable to employ amounts of complexing agent in excess of the stoichiometric amount.

Although we do not wish to be bound by the following theoretical structure, it is believed that the 1:1 complex made using a tridentate chelating agent has a structure of the type represented by lithium chloride and N,N,N′,N″,N″-pentamethyl diethylene-triamine:

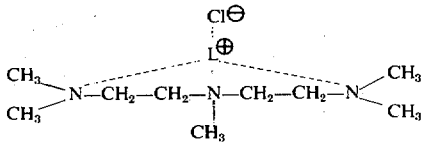

Regardless of the number of functional groups in the chelating complexing agent, the number of functional groups solvating the lithium at one time will never be greater than four and will usually be three. Of course, the bidentate chelating agents can have only two functional groups solvating the lithium.

One of the uses of the complexes of this invention is the separation and purification of the complexing agents. Thus, chelating complexing agents may be separated and/or purified from isomeric and/or homologous non-chelating Lewis bases or other materials. The chelating complexing agents may be purified by complexing therewith with one of the inorganic lithium salts mentioned above and the chelating complexing agent (and the inorganic lithium salt) may then be recovered in a pure form by destablization of the complex which is readily accomplished by addition of polar solvents to the complex (e.g. addition of water, ethylene glycol, methanol, etc.); addition of aqueous or anhydrous acids or bases (e.g. hydrochloric acid, sulfuric acid, acetic acid, lithium hydroxide, sodium hydroxide, ammonium hydroxide, potassium hydroxide, etc.) or by heating at a temperature in the range of about 30° to 250° C. For example, this technique has not only been successful in the purification of chelating agents from their crude preparations, but is can also make possible such difficult separations as between cis and trans isomers.

The purification and/or separation processes described above may, of course, be advantageously utilized with column and counterflow techniques, i.e. the inorganic lithium salt (complexed or uncomplexed) may be contacted with a countercurrent flow of a hydrocarbon solution of the chelating complexing agent sought to be purified and the resultant complex is then subjected to destabilization to recover the desired chelating complexing agent in a pure state.

By analogy, the non-chelating and chelating complexing agents may be used to purify salt mixtures and indeed to synthesize desired lithium salts. Thus, the desired lithium salt may be selectively separated in a pure state from a mixture of metal salts by contacting the mixture (simple contact, column contact and counterflow contact would be suitable) with a complexing agent and thereafter destabilizing the resultant complex as described above to recover the anhydrous pure lithium salt; the complexing agent may then be recycled for further use in purification of lithium salts. Where the anion of the lithium salt is not the desired anion, the anion of the pure complexed lithium salt may be replaced for the desired anion by [anioic] *anionic* exchange and the resultant complex is then destabilized to recover the desired lithium salt in a pure state.

The concept of complex formation with inorganic lithium salts is extremly valuable when applied to the problem of recovery, separation and purification of lithium salts from lithium-bearing ores. A lithium-bearing ore such as spodumene may be treated by various well known methods so as to convert the lithium (present therein as the oxide) into crude aqueous lithium chloride, see e.g. U.S. Pats. 2,627,452 and 2,726,138. Pure anhydrous lithium chloride may then be obtained from the crude aqueous mixture (containing chlorides of lithium and at least one other alkali metal, e.g. potassium and sodium) by contacting the crude aqueous mixture with a hydrocarbon (e.g. benzene) solution of the complexing agent (e.g. N,N,N′,N″,N″-pentamethyl diethylene triamine). A complex of only the lithium chloride results and this complex dissolves in the hydrocarbon phase, leaving behind the aqueous phase containing the other metal chlorides in uncomplexed form. The pure anhydrous lithium chloride may be recovered by removing the hydrocarbon so as to obtain the complex and thereafter destabilizing the complex by heating (e.g. at temperatures of greater than about 30°C.). The complexing agent obtained in the destabilization step may then be recycled to the hydrocarbon phase for further use. Alternatively, the salt may be precipitated from the hydrocarbon solution by heating to destabilize the complex.

The complexing agents of this invention are extremely useful in separating lithium salts from solid alkali metal salt mixtures. Thus, for example, a solid salt mixture consisting of lithium bromide, sodium bromide and potassium bromide may be contacted with a complexing agent such as N,N,N′,N′-tetramethyl ethylenediamine (TMED) in benzene and a benzene-soluble TMED·LiBr complex will form, leaving the sodium and potassium bromides behind. The anhydrous, purified lithium bromide may then be recovered by heating the solution which destabilizes the complex and precipitates pure LiBr. The benzene solution of chelating agent may then be recycled.

The complexing agents of this invention are also useful in separating lithium salts from each other, present as solid (or molten) mixtures or aqueous solutions, by choosing the proper complexing agent. This is an extremely useful property of these complexing agents for there is no known prior art method for achieving such separation.

For example, a mixture of lithium iodide, bromide and chloride may be contacted with a benzene solution of N,N,N′,N′ – tetramethyl-o-phenylenediamine (TM-o-PD) resulting in the formation of the soluble LiI·TM-o-PD complex, and leaving behind the mixture of lithium bromide and lithium chloride. The latter mixture may then be contacted with a benzene solution of cis-N,N,N′,N′-tetramethyl-cyclohexane-diamine (cis-TMCHD) resulting in the formation of the soluble LiBr·cis-TMCHD and leaving behind the lithium chloride. The lithium iodide and lithium bromide may then be recovered from their respective complexes by destabilizing the resultant soluble complexes so as to regenerate the purified lithium iodide, purified lithium bromide and the respective complexing agents.

It has been discovered that the novel complexes of this invention, particularly when dissolved in an aromatic hydrocarbon solvent, afford highly conducting systems. For example, the complex of lithium aluminum hydride with N,N,N′,N″,N″-pentamethyl diethylene triamine, when dissolved in benzene (2 molars), results in a solution having a conductivity of about $3 \times 10^{-3}$ ohm/cm.

The high conductivity of the aromatic hydrocarbon solutions of the novel complexes renders these materials extremely useful for electrochemical reactions (e.g. dimerization of anions such as $NH_2^-$ to prepare hydrazine), as supporting electrolytes and as electrolytes in storage batteries. For example, a secondary battery may be prepared using electrodes such as platinum enclosed in a container which is insoluble in the hydrocarbon solution and utilizing the solution as charge transfer liquid. Alternatively, the battery may be made in the form of a dry cell wherein one electrode, e.g. the anode, serves as the container and the other electrode is centrally spaced from the container. Porous solution-permeable separators may be placed within the electrodes. Primary batteries may also be made using these systems in which one electrode is lithium metal or an alloy. The use of these novel complexes as electrolytes in batteries is disclosed and claimed in application Ser. No. 100,813, filed Dec. 22, 1970, entitled Electric Battery Using Complexed Inorganic Lithium Salts as Charge-Transfer Agent and owned by the same assignee.

The complexed inorganic lithium salts of this invention have also been found to be extremely useful for electrochemical purposes in a solvent-free state. It is well known that molten alkali metal salts, such as lithium iodide in the molten state, are useful as electrical conductors. However, the use of such molten salts entails special equipment and procedures since they have high melting points, e.g. LiI melts at 450° C. and LiBr melts at 547° C. However, this disadvantage can be readily overcome by complexing the lithium salt with a complexing agent such as N,N,N′,N″,N″-pentamethyl diethylenetriamine (PMDT). Crystalline LiI·PMDT complex starts to melt at about 84° C. and is completely molten at about 110° C. At 110° C., PMDT·LiBr is molten and has a conductivuty of $5.2 \times 10^{-4}$ (ohm-cm.)$^{-1}$. Some lithium salts, such as lithium aluminum hydride, decompose below their melting points but complexation can extend their utility. For example $LiAlH_4$ decomposes at 110–125° C., whereas PMDT·$LiAlH_4$ melts without decomposition at 150–155° C. and can be sublimed at 125° C./0.5 mm. When complexed by HMTT, $LiAlH_4$ is stable to over 200° C.

Complexes of metal hydrides (e.g. $LiAlH_4$, $LiBH_4$, etc.) have been found to be superior to the uncomplexed form as reducing agents. The complex of $LiAlH_4$ and N,N,N′,N″,N″-pentamethyl diethylenetriamine (PMDT) is very reactive and effective in carbonyl reduction. For example, in attempting to prepare 1,2-bis-(hydroxymethyl)cyclohexane from phthalic acid, the relatively cheap intermediate, hexahydrophthalic anhydride, was reduced to the corresponding 1,2-dihydroxy compound with the conventional $LiAlH_4$-in-ether only with great difficulty and with relatively poor yield. It was therefore necessary to first hydrogenate diethyl phthalate to the corresponding hexahydro ester and thereafter reduce this ester to the 1,2-dihydroxy compound. However, by using the $$LiAlH_4 \cdot PMDT$$

complex in benzene, the cheap hexahydrophthalic anhydride was reduced to the 1,2-dihydroxy compound with an 80% yield of 96% pure material thereby saving costs of raw materials and one process step. The complexed metal hydrides are also very useful in reducing esters, ketones, aldehydes, alkyl sulfones (which are generally not reduced by the uncomplexed metal hydrides in ether) or other inorganic compounds, etc.

The complexes of this invention, when dissolved in suitable solvents such as aromatic hydrocarbons, may be employed as oil or fuel additives. Thus, iodide or bromide ions (particularly the former) are known to be useful as oil additives in order to reduce wear, act as a radical scavenger, reduce sludge, etc. The problem in the past, however, is to get the halide ion into solution in the oil. This problem is readily overcome since the complexed inorganic lithium salts of this invention have sufficient hydrocarbon solubility. As fuel additives, various complexes may be used as ignition promoters, hypergolic compositions, combustion improvers, antismoke agents, etc.

The novel complexes of this invention have also been found to be useful as carriers for a variety of chemicals and gases which can be absorbed by interaction with the lithium cation, the anion or both. The complexes may thus be used to introduce controlled amounts of reactants, to moderate reactivity, to improve selectivity, to effect separations, etc. Examples of the gases and chemicals which can be "carried" by the complexes include $O_2$, $I_2$, $Br_2$, $Cl_2$, $F_2$, $H_2O$, $H_2S$, ROH, RSH, $BH_3$ and higher boranes, NO, $NO_2$, and other oxides of nitrogen $SO_2$, $SO_3$, NOCl, CO, $CO_2$, $NH_3$, $PH_3$, $AsH_3$.

The "chemical carrier" concept mentioned immediately above may be represented by the following equation in which X is e.g. a halide ion and $X'_2$ is e.g. a halogen:

$$\text{Complexing Agent}\cdot LiX + X_2' \rightarrow \text{Complexing Agent}\cdot LiXX_2'$$

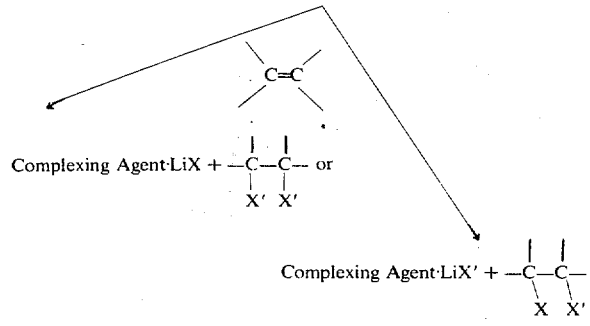

A specific example of the "chemical carrier" reaction is:

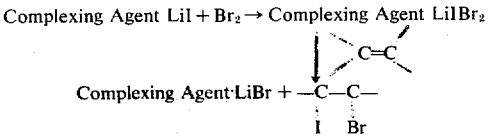

The novel complexed inorganic lithium salts of this invention may be utilized for a variety of reactions. For example, the complexes may be utilized in displacement reactions:

Complexing Agent·LiI+$\phi CH_2Cl \rightarrow \phi CH_2I$+Complexing Agent+LiCl

The complexed inorganic lithium salts may be utilized in addition reactions:

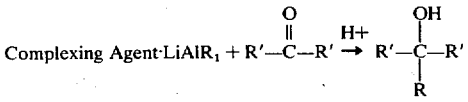

The complexed inorganic lithium salts may also be used as catalysts in polymerization reactions:

$$PMDT \cdot LiNH_2 + CH_2C(CH_3)CO_2CH_3 \xrightarrow[\text{poly-(methylmethacrylate)}]{NH_3}$$

As an outgrowth of this invention, it has been found possible to prepare novel complexed lithio radical anions (particularly with the use of the chelating type of complexing agent).

These novel lithio radical anions may be prepared by two methods. In the first method, a lithium dispersion and a chelating agent are admixed with an aromatic compound (e.g. benzene, naphthalene, anthracene, etc. as well as alkyl derivatives thereof). Depending on the particular aromatic compound of choice, a complexed mono- or dilithio radical anion is formed; the general structure of such an anion is as follows:

$$[\text{Chelating Agent}\cdot Li]^{\oplus}[Ar]^{\ominus}$$

The second method involves the admixture of lithium metal and a chelating complexing agent containing an aromatic nucleus; this complexing agent may be used as is or dissolved in a hydrocarbon. By this method, novel lithio radical anions having the following general structures may be prepared:

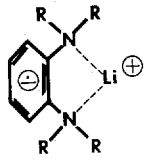
A.

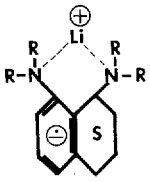
B.

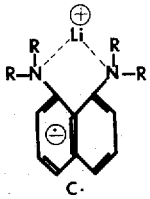
C.

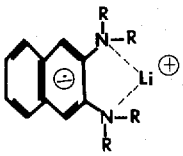
D.

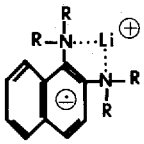
E.

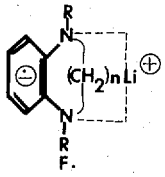
F.

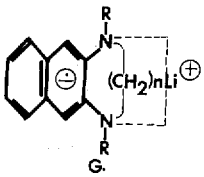
G.

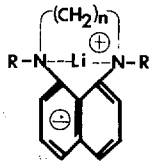
H.

In the general formulas above, the rings may contain substituents and R is hydrocarbon (e.g. alkyl) radical of 1 to 20 carbon atoms and n is an integer of 1 to 10. It should also be understood that the multi-ring analogs (anthracene, phenanthrene, etc.) and heterocyclic aromatics, as well as the alkaryl or aralkyl analogs of these chelating aromatic-tert.-diamines may be used.

The novel complexed lithio radical anions are useful as catalysts, as electrochemical media, in batteries, as reducing agents, additives and in syntheses.

It has been found possible to incorporate the complexed inorganic lithium salts of this invention onto the surface or integrally with the structure of polymers. For example, rigid, brittle polystyrene was dissolved in benzene and to this solution was added a benzene solution of LiBr·PMDT complex. After casting a film from the resultant solution, flexible polystyrene was obtained containing one unit of LiBr·PMDT complex per three styrene units in the polymer.

The incorporation of the complexed inorganic lithium salts permits the physical and electrochemical properties of the polymer to be varied. Thus, by integrating the complex within the polymer, a highly conductive polymer may be readily obtained. With smaller proportions of chelated lithium salts, the polymer compositions may have semi-conductor properties. On the other hand, the surface of the polymer may be treated with the complex, thus rendering the polymer electroplatable, printable or dyeable by well known methods. In addition, the surface bonding properties of the polymer may be altered.

Complexes containing oxidizing anions, such as perchlorate, chlorate, hypochlorite, etc., are useful new hydrocarbon soluble oxidizing agents. In some cases, they are active catalysts or catalyst components in combination with other oxidizing agents, such as oxygen.

This invention is illustrated by the following examples:

EXAMPLE 1

A complex of N,N,N′,N′-tetramethyl - 1,2 - ethanediamine (TMED) and LiBr was prepared by grinding 4.34 g. (0.05 mole) LiBr with 5.81 g. (0.05 mole) TMED under nitrogen at 50–60° C. to obtain a white paste; an additional 2 ml. TMEDA was added during the grinding to make up for vapor losses. The paste was placed in a bottle at 25° C. overnight and the next day it was found that the paste had turned to a dry powder. An additional 2 ml. TMED was added to the bottled mixture which was then allowed to stand for 2 days at 25° C. to complete the reaction. After vacuum drying to remove excess TMED, 9.87 g. of the complex was obtained (theory for a 1:1 complex is 10.15 g.). The complex was characterized by infrared and elemental analysis. Found: 40.1% Br; 12.4% N. Calcd.: 38.9% Br; 13.8% N.

complexing agents to dispersions of the lithium halides in benzene. The benzene-soluble (except for that of the poly-N-methyl ethyleneimine) crystalline complexes were recovered by evaporation of the benzene; HMTT afforded a 2:1 LiBr:HMTT complex and a 1:1 LiBr:HMTT complex. The results are shown in Table II.

TABLE II

| Lithium salt, g. (moles) | Complexing agent, g. (moles) | Isolated complex, g. | Complex analysis Found C | N | H | Br | I | Theory C | N | H | Br | I |
|---|---|---|---|---|---|---|---|---|---|---|---|---|
| LiBr. 0.87 g. (0.008 mole) | PMDT. 1.73 g. (0.01 mole) | 1.57 | 40.59 | 18.23 | 8.58 | 32.29 | | 41.55 | 16.15 | 8.91 | 32.29 | |
| LiI, 4.02 g. (0.03 mole) | PMDT. 5.2 g. (0.03 mole) | 2.35 | 34.02 | 13.80 | 7.83 | | 39.39 | 35.19 | 13.68 | 7.55 | | 41.32 |
| LiCl, 2.12 g. (0.046 mole) | PMDT, 8.67 g. (0.05 mole) | 1.16 | | | | | | | | | | |
| LiBr, 0.87 g. (0.008 mole) | HNTT, 2.30 g. (0.01 mole) | [a] 0.88 | 33.9 | 13.6 | 7.0 | 39.4 | | 35.67 | 13.87 | 7.48 | 39.55 | |
| | | [b] 0.80 | | 16.39 | | | | 45.43 | 16.39 | 9.53 | 29.09 | |
| LiBr, 0.55 g. (0.006 mole) | Poly-N-methyl ethyleneimine, 1.1 g | [c] 1.49 | Found: 0.73 LiBr per 2-[$CH_2CH_2$—$N(CH_3)$]-units | | | | | | | | | |

[a] 2 LiBr to 1 HMTT.
[b] 1 LiBr to 1 HMTT.
[c] Insoluble in benzene.

EXAMPLE 2

Various lithium halides were dispersed in 50 ml. benzene and N,N,N′,N′-cis or trans-tetramethyl-1,2-cyclohexane-diamine (cis-TMCHD or trans-TMCHD) was added with stirring. The white crystalline complex was recovered from the clear solution by evaporation of the benzene. The results shown in Table I indicate that a 1:1 complex of the lithium halide and cis-TMCHD or trans-TMCHD was formed in each case.

EXAMPLE 4

Lithium iodide, 0.138 g. (0.001 mole) was placed in a small vial and 0.5 ml. of a 2 molar solution of N,N,N′,N′,N″,N″-hexamethyl cyclohexane-1,3,5-triamine (HMCHT)

in heptane was added to the salt. The LiI became sticky, 2 g. benzene was added and the solids were

TABLE I

| Li salt, g. (moles) | Complexing agent, g. (moles) | Isolated complex, g. | Complex analysis Found C | N | H | Br | Cl | I | Theory C | N | H | Br | Cl |
|---|---|---|---|---|---|---|---|---|---|---|---|---|---|
| LiBr, 3.47 g. | Trans-TMCHD, 6,8 | 9.6 | 47.78 | 11.21 | 9.25 | 31.42 | | | 46.71 | 10.89 | 8.62 | 31.08 | |
| (0.04 mole). LiBr, 1.41 g. | [p.I g. (0.04 mole). $C_1$s-TMCHD, 3.0 g. | 0.67 | 46.7 | 10.8 | 9.8 | 31.5 | | | 46.7 | 10.9 | 8.6 | 31.1 | |
| (0.016 mole). LiCl, 1.06 g. | (0.016 mole). Trans-TMCHD, 3.4 | 1.95 | 57.4 | 13.8 | 9.36 | | 18.1 | | 56.5 | 13.2 | 10.4 | | 16.7 |
| (0.023 mole). LiI, 3.35 g. | [p.I g. (0.02 mole). | 0.77 | 39.14 | 9.13 | 7.52 | | | 43.47 | 39.50 | 9.21 | 7.29 | | 41.72 |
| (0.025 mole). | | | | | | | | | | | | | |

The NMR spectra of benzene solutions of the complexes obtained in this example show substantial shifts in the ring and methyl group resonances compared with trans-TMCHD and cis-TMCHD alone, at the same concentrations in benzene. These shifts establish the fact that the complex also exists in the benzene solution.

EXAMPLE 3

Crystalline complexes of LiBr, LiCl and LiI with N,N,N′,N″,N″-pentamethyl diethylenetriamine (PMDT); N,N,N′N″,N‴,N‴-hexamethyl triethylenetetramine (HMTT)

and a polymer of N-methyl ethyleneimine (molecular weight of about 10,000) were prepared by adding the mixed with a spatula and then allowed to dry for one day. The white residue was washed with pentane and dried. Analysis of the dried solid showed: C: 24.48%; H: 5.15%; N: 7.50%; I: 64.22%. These analytical results are in accord with a composition containing 3 LiI molecules per molecule of HMCHT. Hence, by proper choice of the lithium salt and complexing agent, compositions may be obtained with more than one salt molecule per molecule of complexing agent.

EXAMPLE 5

To 1.34 g. (0.01 mole) of LiI in 25 ml. benzene was added 1.29 g. (0.01 mole) of N,N′,N″-trimethylhexahydro-s-triazine (TMHT); a fluffy solid resulted. Benzene (75 ml.) was added and the mixture was heated to 60° C. with stirring and then filtered; a residue (0.75 g.) was obtained. The filtrate was cooled and concentrated under reduced pressure and 0.8 g. of fine white needles was recovered. Analysis of these needles showed: C: 25.23%; H: 6.61%; N: 14.14%; I: 46.0%; theory for LiI·TMHT is C: 27.4%; H: 5.8%; N: 16.0%; I: 48.2%.

In the same manner, the chelate LiBr·TMHT was prepared from 0.87 g. LiBr and 1.29 g. TMHT. The crystalline chelate analyzed as: C: 35.0%; N: 20.12%; Br: 30.53%; theory: C: 33.35%; N: 19.45%; Br: 36.99%.

EXAMPLE 6

To 1.34 g. (0.01 mole) of LiI in 25 ml. benzene was added with stirring 1.64 g. (0.01 mole) of N,N,N',N'-tetramethyl-o-phenylenediamine (TM-o-PD). The mixture was stirred for 18 hours, an additional 90 ml. benzene was added, the mixture was heated to boiling, filtered (0.65 g. solids removed) and the filtrate concentrated to 15 ml. Thereafter 0.8 g. of fine, white crystals were obtained by filtration, followed by two washings with benzene (5 ml. portions), two washings with pentane (10 ml. portions) and drying. Analysis of the crystalline LiI·TM-o-PD complex showed: C: 40.59%; H: 5.44%; N: 9.74%; I: 43.7%; theory: C: 40.29%; H: 5.41%; N: 9.4%; I: 43.7%.

EXAMPLE 7

To 0.43 g. (0.005 mole) of LiBr was added 5 ml. of a 1 molar solution of 2-(dimethylamino)ethyl methyl ether (DMEME) in n-heptane with stirring and a fluffy solid resulted. The suspension was filtered and the residue was washed with benzene whereupon most of it quickly dissolved, giving a clear, colorless benzene filtrate. Partial evaporation of the benzene filtrate afforded 0.83 g. colorless, rectangular crystals of LiBr·DMEME complex which was washed with two 5 ml. portions of pentane and dried. The crystals analyzed as: C: 31.41%; H: 6.96%; N: 7.88%; Br: 42.88%; O: 8.8%; theory: C: 31.60%; H: 6.90%; N: 7.37%; Br: 42.06%; O: 8.42%.

EXAMPLE 8

Set forth in Table III are the thermal stabilities and benzene solubilities at room temperature of several crystalline complexes. These data indicate that the complexes have different stabilities and solubilities. Thus, lithium salts can be separated from one another and from other metal salts, and complexing agents may be separated from one another and from other materials. The purified lithium salts and complexing agents can be readily recovered by merely heating the complex alone or in solution at preferably above its decomposition temperature (the lithium salts starts to precipiate out at such temperatures); such destabilization heating may also be advantageously accomplished in the presence of a hydrocarbon which will solubilize the complexing agent, but not the complex or the lithium salt. Although quantitative recovery (by heating or other destabilization techniques) of the lithium salt and complexing agent is not possible in a single batch operation (because of equilibria of the destabilization reaction), a cyclic process can (and should be used if quantitative recovery is desired.

TABLE III

| Lithium salt | Complexing agent | Decomposition temp.,°C.(at ~0.5 mm. Hg) | Solubility in benzene (molar) |
|---|---|---|---|
| LiCl | Trans-TMCHD | 20 | 0.5. |
| LiBr | do | 125 | 0.8. |
| LiI | do | 203 | 0.3. |
| LiBr | Cis-TMCHD | 80 | ~0.1. |
| $LiAlH_4$ | TM-o-PD | | 1.01. |
| LiI | TM-o-PD | 97 | 0.4. |
| LiBr | TMED | 50–100 | 1.6. |
| $LiNO_3$ | TMED | | 0.3. |
| $LiAlH_4$ | TMED | 125 (at 1.3 mm.)[a] | 0.82. |
| $LiBH_4$ | TMED | | 1.0. |
| $LiAlH_4$ | 2 TMED | ([b]) | 0.17. |
| 2 LiBr | HMTT | ~143 | ~0.1. |
| LiBr | HMTT | ~40 | ~0.3. |
| $LiNO_3$ | HMTT | | >0.2.1 |
| $LiBH_4$ | HMTT | | 3.0. |
| $LiAlH_4$ | HMTT | > 200[c] | 0.005. |
| $LiBF_4$ | HMTT | | 1.3. |
| 3 LiI | HMCHT | 60 | >0.1. |
| $LiAlH_4$ | TM-o-PDA | | 1.01. |
| LiI | TMHT | 72 | 0.2. |
| LiCl | PMDT | 70 | 2.5. |
| LiBr | PMDT | 86[d] | 2.5. |
| LiI | PMDT | Sublimes[e] | 2.5. |
| $LiNO_3$ | PMDT | | 2.66. |
| $LiBH_4$ | PMDT | 75 (at 1 mm.)[f] | Forms gel.[f] |
| $LiAlH_4$ | PMDT | ([g]) | 1.8 |
| $LiBF_4$ | PMDT | ([h]) | 0.19. |
| $LiPF_6$ | PMDT | | 1.25. |
| $LiB(C_6H_3)_4$ | PMDT | | 0.04. |

[a] Blackens above 176°C.
[b] M.P. 118–120°C.
[c] Stable to 200°C., M.P. > 200°C.
[d] M.P. 92–93.5°C.
[e] M.P. 89–110°C.
[f] M.P. 74–81°C.
[g] Sublimes wye decomp. at 125°C., 0.5 mm.; M.P. 150–155°C.
[h] M.P. 118–121°C.
[i] Solubility greater than 3 molar at 25°C.
[j] HMTT-$LiNO_2$ is a liquid at 25°C.

EXAMPLE 9

TMCHD was prepared in 90% yield via the following reaction:

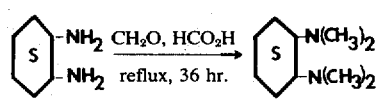

The reaction product was distilled and found to be 95.8% pure TMCHD by gas-liquid chromatography. The distilled product contained 4 impurities which could not be removed by distillation (tert.-amines having almost exactly the same boiling point and the same molecular weight as TMCHD). One impurity was identified as N,N,N',N'-tetramethyl-1,3-cyclohexane diamine.

Solid $LiBr \cdot xH_2O$ (~0.9 equivalent) was added to the distilled TMCHD and the resultant semi-solid was allowed to stand 48 hours. Heptane was added to form a slurry which was then allowed to stand 72 hours. The slurry was then filtered, washed with additional heptane and hydrolyzed (i.e. destabilized) with aqueous KOH. The hydrolysis mixture was made basic with aqueous KOH and TMCHD of 99.6% purity (by vapor phase chromatography) was obtained by distillation of the product recovered from the hydrolysis mixture.

EXAMPLE 10

Lithium fluoride, 0.26 g. (0.01 mole) was placed in a 10 ml. stainless steel capsule along with a 12 mm. ball and 5.16 g. (0.03 mole) of PMDT. The sealed capsule was shaken at high speed on a Tobar mixer mill and the capsule was then opened and the contents were filtered. The slightly wet solid weighed 0.31 g. (the 0.05 g. weight increase was due to LiF being wet), thus indicating that no complex had formed. This example demonstrates that when the lattice energy of the inorganic lithium salt is too great to be overcome by cation solvation by this particular complexing agent, a complex is not formed.

EXAMPLE 11

Lithium bromide, 0.43 g. (0.005 mole) was dispersed in 5 ml. benzene and 0.98 g. (0.005 mole) of 1,2-bis-(piperidino)-ethane was added with stirring. After 18 hours, the solid increased substantially in volume and a fluffy white material resulted. The mixture was filtered and 1.44 g. of a slightly wet solid complex was isolated (theory: 1.41 g.). This example illustrates the possibility of using as the complexing agent a compound in which the alkyl groups attached to the nitrogen atoms may be part of a saturated heterocycle.

Analysis.—Theory (percent): C, 50.9; H, 8.48; N, 9.90. Found (percent): C, 56.23; H, 8.67; N, 8.27.

EXAMPLE 12

Lithium bromide, 0.87 g. (0.001 mole) and 5.17 g. (0.003 mole) of N,N,N',N' - tetramethyl-1,6-hexanediamine (TMHD) were combined and shaken in a capsule for one hour at high speed. The mixture was then filtered and 2.32 g. of slightly wet solid was obtained (theory: 2.59 g.). Thus, LiBr and TMHD yielded a 1:1 complex.

In a similar manner, 0.95 g. (25 mmole) of $LiAlH_4$ was dispersed in 17 ml. benzene and 4.31 g. (25 mmole) of TMHD was added with stirring. After 18 hours, the mixture was filtered and 4.77 g. of a light grey solid was recovered (theory: 5.26 g.). Thus, $LiAlH_4$ and TMHD formed a 1:1 complex which is slightly soluble in benzene.

EXAMPLE 13

Lithium nitrate, 6.90 g. (0.[0]1 mole) was dispersed in 30 ml. benzene and 17.33 g.(0.[0]1 mole) of PMDT was added to the suspension with stirring. The mixture was diluted to 50 ml. with benzene and was stirred at room temperature for 18 hours. The resultant clear, colorless solution was allowed to evaporate, whereupon 5.31 g. of a white crystalline solid was obtained. This solid analyzed as a 1:1 complex of $LiNO_3$ and PMDT.

By the same general procedure as described above, $LiNO_3$·TMED and $LiNO_3$·HMTT complexes were also prepared; the data for all of these complexes are shown in Table IV.

EXAMPLE 14

Lithium aluminum hydride, 0.37 g. (19 mmole) was mixed with 1.44 g. (10 mmole) of N,N,N',N'-tetramethyl-1,4-butanediamine (TMBD). The resulting paste was stirred for 18 hours then diluted with 6 ml. benzene and filtered. The insoluble complex weighed 1.40 g. and upon evaporation of 2 g. of the filtrate, an additional 0.05 g. of white solid was obtained, thus indicating that $LiAlH_4$·TMBD has some solubility in benzene.

$LiAlH_4$, 3.80 g. (100 mmole) was dispersed in 50 ml. of benzene and 11.62 g. (100 mmole) of TMED were added. The mixture was diluted to 100 ml. of benzene, stirred at room temperature for hours and filtered. A grey residue of 0.22 g. (5.8% of the starting $LiAlH_4$) was removed and the clear, colorless filtrate was allowed to evaporate under nitrogen. A white crystalline solid was isolated by filtration and the mother liquor was allowed to evaporate further and a second and third crop of crystals were isolated. A total quantity of 9.0 of 1:1 complex of $LiAlH_4$ and TMEd was obtained.

To a 25 ml. portion of 0.75 molar solution of $LiAlH_4$·TMED in benzene was added dropwise an additional 2.18 g. (18.75 mmole) of TMED with stirring. A white precipitate (4.28 g.) was isolated by filtration of the mixture. This solid, upon analysis, indicated that a 1:2 complex of $LiAlH_4$ and TMED was formed. Thus, $LiAlH_4$ and TMED can form two distinct compositions of matter: $LiAlH_4$·TMED and $LiAlH_4$·2TMED.

Using the procedure described above, the crystalline complex $LiAlH_4$·PMDT and the crystalline complex $LiAlH_4$·HMTT were prepared. The former was found to be so highly soluble in pure benzene that it was found that as a preferred procedure for obtaining the crystalline complex $LiAlH_4$·PMDT, it was desirable to add heptane to the solution (whereupon it split into two liquid phases) and allow crystals to grow from the resultant two phase mixture by solvent evaporation. The crystalline complex $LiAlH_4$·HMTT was prepared by complexing agent exchange from both $LiAlH_4$·PMDT and $LiAlH_4$·TMED by addition of HMTT to benzene solutions of the complexes. $LiAlH_4$·HMTT precipitated in nearly quantitative yield.

$LiBH_4$·PMDT was prepared by the method described for the preparation of $LiAlH_4$·PMDT and $LiBH_4$·HMTT was prepared from $LiBH_4$ and HMTT. The complexing agent exchange was not used to prepare the latter complex since $LiBH_4$·HMTT is very soluble in benzene in contrast to $LiAlH_4$·HMTT.

The results of this example are summarized in Table V below.

TABLE IV

| Lithium salt. g. (moles) | Complexing agent g. (moles) | Isolated complex, g. | Complex analysis Found C | N | H | Li | Theory C | N | H | $L_1$ |
|---|---|---|---|---|---|---|---|---|---|---|
| $LiNO_3$, 1.72 (25 mmole) | TMED, 2.90 (25 mole) | 1.28 | 38.99 | 22.70 | 8.79 | | 38.96 | 22.71 | 8.66 | |
| $LiNO_3$, 6.90 (0.[0]1 mole) | PMDT, 17.33 (0.[00]1 mole) | 5.31 | 44.24 | 24.47 | 9.54 | 2.89 | 44.63 | 23.13 | 9.57 | 2.86 |
| $LiNO_3$, 1.72 (25 mmole) | HMTT, 5.76 (25 mmole) | [a] 7.50 | 47.32 | 22.74 | 9.99 | | 48.2 | 23.4 | 10.0 | |

[a] Complex is a liquid at 25°C.

TABLE V

| Lithium salt, g. (moles) | Complexing agent, g. (moles) | Isolated complex, g. | Complex analysis Found C | N | H | Al | Li | Theory C | N | H | Al | Li |
|---|---|---|---|---|---|---|---|---|---|---|---|---|
| $LiAlH_4$, 3.8 g. (100 mmole) | TMED, 11.62g. (100 mmole) | 9.0 | 46.66 | 18.56 | 13.42 | 17.48 | | 46.75 | 18.17 | 13.08 | 17.5 | |
| $LiAlH_4$, 0.72 g. (19 mmole) | 2 TMED, 4.36g. (38 mmole) | 4.28 | 53.43 | 20.67 | 13.34 | 9.98 | | 53.31 | 20.72 | 13.42 | 9.98 | |
| $LiAlH_4$, 2.85 g. (75 mmole) | PMDT, 13.01g. (75 mmole) | 6.5 | 49.85 | 19.42 | 12.41 | 13.39 | | 51.17 | 19.89 | 12.88 | 12.77 | |
| $LiAlH_4$, 1.43 g. (37 mmole) | HMTT, 8.64g. (37 mmole) | 9.95 | 53.18 | 20.44 | 12.57 | 9.86 | | 53.70 | 20.88 | 12.77 | 10.05 | |
| $LiAlH_4$, 1.9 g. (50 mmole) | TM-o-PD, 8.21g. (50 mmole) | 2.9 | 59.14 | 12.73 | 9.21 | | | 59.40 | 13.86 | 9.97 | | |
| $LiBH_4$, 2.18 g. (100 mmole) | PMDT, 17.5g. (100 mmole) | 6.0 | 56.03 | 21.44 | 13.95 | | 3.75 | 55.41 | 21.54 | 13.95 | | 3.56 |
| $LiBH_4$, 1.09 g. (50 mmole) | HMTT, 11.52g. (50 mmole) | 1.8 | 57.24 | 22.89 | 13.63 | | 2.81 | 57.15 | 22.22 | 13.59 | | 2.75 |
| $LiBH_4$, 0.50 g. (23 mmole) | TMED, 2.9g. (25 mmole) | 1.7 | 52.19 | 19.91 | 15.14 | | | 52.21 | 20.31 | 14.50 | | |

The infrared spectrum of lithium aluminum hydride alone in Nujol has two bands at 1775 and 1625 $cm.^{-1}$ of equal intensity for the Al—H stretch (these assignments have been vertified by infrared spectra of $LiAlH_4$). This is because $LiAlH_4$ follows $C_2V$ symmetry which predicts at least two Al—H stretching frequencies and indicates considerable H-L*i*—H interaction approaching a 3 center-2 electron bond (figure A) resulting in a rather covalent compound. $LiAlH_4$·PMDT in Nujol has only one Al—H stretch at 1690 $cm.^{-1}$. This can only occur if the $AlH_4$ anion now follows Td symmetry selection rules which predict only one infrared active Al—H stretch. Thus, the $AlH_4$ anion in the complex is more ionic as the H—Li—H interaction has been removed (figure B). The substance is now a cation solvated contact ion pair.

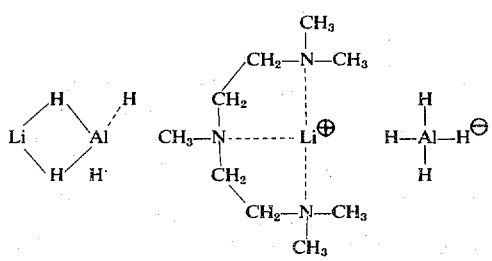

Figure A Figure B

The significance of these findings is that in $LiAlH_4$ ·PMDT (and $LiAlH_4$·HMTT), the $AlH_4$ anion is fundamentally different from that of uncomplexed $LiAlH_4$. The anion is a free $AlH_4$ anion in a contact ion pair rather than part of a covalent molecule. Associated with such changes in the structure as increased reactivity, such as in reductions, and increased conductivity. The same infrared spectral changes have been found for $LiBH_4$ vs. $LiBH_4$ ·HMTT. Differences in the infrared spectrum of the anion of lithium-anion vs. lithium-anion complexing agent are direct evidence for the complexes being distinct compositions of matter having unique properties and not solution or mixtures of a salt and a complexing agent.

By using these techniques, impure commercial $LiAlH_4$ and $LiBH_4$ may be easily purified of associated contaminants as the latter do not pass into benzene solution in the presence of these complexing agents. Filtration of the mixture followed by evaporation of the solvent, destabilization of the complex and removal of the complexing agent would afford extremely pure $LiAlH_4$ or $LiBH_4$. Alternatively, the pure hydrides could be precipitated from solution by heating or by addition of another substance which complexes more strongly with the complexing agent than do the hydrides. Preferably, the complexes are utilized directly in the solvents in which they are prepared.

EXAMPLE 15

$LiBF_4$, 4.68 g. (50 mmole) was dispersed in 25 ml. benzene and 8.66 g. (50 mmole) of PMDT was added. The mixture was diluted to 50 ml. with benzene and stirred at room temperature. The solution was filtered, thereby removing 50 mg. of insoluble material and the colorless filtrate was allowed to partially evaporate so as to yield 6.3 g. of the crystalline $LiBF_4$ ·PMDT complex.

In the same manner, the complexes $LiBF_4$ ·HMTT, $LiPF_6$·PMDT and $LiB(C_6H_5)_4$ ·PMDT were prepared. The results of this example are summarized in Table VI.

TABLE VI

| Lithium salt, g. (moles) | Complexing agent, g. (moles) | Isolated complex, g. | Complex analysis Found C | N | H | Li | Theory C | N | H | Li |
|---|---|---|---|---|---|---|---|---|---|---|
| $LiBF_4$, 4.68 g. (50 mmole) | PMDT, 8.66 g. (50 mmole) | 6.3 | 40.63 | 16.19 | 8.29 | 2.60 | 40.48 | 15.74 | 8.68 | 2.60 |
| $LiBF_4$, 4.69 g. (50 mmole) | HMTT, 11.52 g. (50 mmole) | 5.3 | 45.72 | 18.49 | 9.44 | | 44.46 | 17.28 | 9.33 | |
| $LiPF_6$, 7.6 g. (50 mmole) | PMDT, 8.66 g. (50 mmole) | 5.1 | 33.96 | 13.62 | 7.38 | 2.44 | 33.24 | 12.92 | 7.13 | 2.13 |
| $LiB(C_6H_5)_4$, 0.65 g. (2 mmole) | PMDT, 0.35 g. (2 mmole) | 0.78 | 76.65 | 9.73 | 9.28 | | 79.35 | 8.41 | 8.68 | |

EXAMPLE 16

3.35 g. (25 mmole) of LiI was dispersed in 50 ml. of benzene and 5.88 g. (25 mmole) of N′-phenyl-N,N,N″, N″ - tetramethyldiethylenetriamine (N′-$\phi$-TMDT) was added with stirring and after 18 hours the mixture was filtered. The fine, white solid residue weighed 2.74 g. and the filtrate deposited colorless crystals when allowed to partially evaporate. The solid residue analyzed as a 1:1 chelate of N′-$\phi$-TMDT and LiI.

In a similar manner N′-$\phi$-TMDT ·$LiAlH_4$ was prepared and the data are summarized in Table VII. Therefore, the chelating agent of an inorganic lithium salt chelate may have an aryl group attached to a nitrogen atom as well as alkyl groups.

EXAMPLE 17

6.1 g. of crude cis and trans-1,2-diaminocyclooctane were methylated with formaldehyde and formic acid. A total of 5.1 g. of distilled impure cis- and trans-tetramethyl-1,2cyclooctanediamine (B.P. 47–53° C./0.29 mm.) was obtained from the methylation reaction which by VPC analysis contained six components: A, 2.1%; B, 10.7%, C, 19.6%; D, 14.8%; E, 7.5%; F, 45.4%. The methylated diamine mixture was diluted with 10 ml. of heptane and 0.86 g. of LiBr was added and the resulting pasty mixture was stirred for three days. VPC analysis of the liquid phase gave the following composition: A, 2.8%; B, 13.6%; C, 6.9%; D, 6.4%; E, 11.4% F, 59.0%. The solid was recovered by filtration washed with pentane, dried and hydrolyzed with 3 ml. of 10% NaOH solution. The resulting organic phase was extracted with heptane. The heptane was removed under reduced pressure and the oily residue was examined by VPC. The material was found to be A, 1.4%; B, 0%; C, 63.6%; D, 30.1%; E, 0%; F, 1.3%. Components C and D were identified by time of flight mass spectral analysis as cis-and trans-tetramethyl-1,2-cyclooctanediamine. Thus, the desired diamine was recovered in 93.7% purity by a single treatment starting with only 34.4% pure feed.

TABLE VII

| Chelating agent, g. | Salt, g. | Chelate isolated, g. | Analysis Theory C | H | N | Found C | H | N |
|---|---|---|---|---|---|---|---|---|
| N′-$\phi$-TMDT(5.88) | LiI (3.35) | 2.5 | 45.53 | 6.78 | 11.38 | 45.90 | 7.11 | 11.41 |
| N′-$\phi$-TMDT(5.88) | $LiAlH_4$ | 0.5 | 61.55 | 10.62 | 15.38 | 61.03 | 10.80 | 15.26 |

The above data demonstrate that chelating diamines may be separated from and/or purified of closely related impurities via complex formation with an inorganic lithium salt. The chelating diamine may be recovered by destabilization of the intermediate complex by heating or hydrolysis, etc.

EXAMPLE 18

0.95 g. (25 mmole) of $LiAlH_4$ was dispersed in 25 ml. of benzene and 2.55 g. (25 mmole) of tetramethylmethane diamine (TMMD) was added with stirring. After 18 hours, stirring was stopped, the reaction mixture was allowed to settle and 2 g. of the clear liquid phase was transferred to a watch glass and allowed to evaporate. A white crystalline residue, wt. 0.1 g., remained which reacted vigorously with water evolving gas.

0.95 g. (25 mmole) of $LiAlH_4$ was dispersed in 10 ml. of benzene, 5.11 g. of TMMD (50 mmole) was added, the mixture was diluted to 24 ml. and stirred for 20 hours. The reaction mixture was filtered and a gray solid residue, wt. 0.35 g., remained on the filter disc (ASTM-10–15). The clear colorless filtrate afforded white crystals upon partial evaporation which evolved hydrogen gas when hydrolyzed. Therefore, an excess of the complexing agent gives a greater amount of $LiAlH_4$ complex in solution.

The above data demonstrate that inorganic lithium salts and ditertiary amines in which both nitrogen atoms are on the same carbon atom can form complexes which may be hydrocarbon soluble.

EXAMPLE 19

0.21 g. (2 mmole) of $LiClO_4$ was dispersed in 5 ml. of benzene and 0.35 g. (2 mmole) of pentamethyldiethylene triamine (PMDT) was added with stirring at room temperature. The solid perchlorate gradually dissolved giving a clear colorless solution. Evaporation of a portion of the benzene solution gave a white crystalline solid residue of PMDT·$LiClO_4$.

EXAMPLE 20

Atactic polystyrene pellets (5 g.) were dissolved in 100 ml. of benzene with stirring. To the solution was added 4.15 g. (16 mmole) of PMDT·LiBr which readily dissolved giving a clear homogeneous mixture. 17.5 g. of the polystyrene-chelate solution was transferred to a crystallizing dish and the solvent was allowed to evaporate. A transparent film resulted containing one PMDT·LiBr chelate per three styrene monomer unis as an integral part of the polymer.

Analysis.—Theory for 1 PMDT·LiBr per 3 styrene units (percent): C, 69.22; H, 8.27; N, 7.34; Br, 13.96. Found (percent): C, 70.41; H, 8.27; N, 6.88; Br, 13.40.

Although one particular ratio of lithium salt chelate to monomer unit and one particular polymer was employed in this example, many other ratios and other polymers, such as substituted polystyrenes, polybutadiene, polyacrylonitrile, polyacrylates, block and random copolymers, etc., may be used to prepare a variety of modified polymer compositions in which the lithium salt is uniformly incorporated throughout the polymer. Under the proper conditions, such as heating under reduced pressure, the chelating agent could be removed from the composition thereby forming a material in which a lithium salt alone was dispersed evenly through a polymer network.

EXAMPLE 21

To 210 ml. of 1.0 M $LiAlH_4$·PMDT (0.21 mole in benzene) was added dropwise a solution of 45.5 g. diethyl hexahydrophthalate. A vigorous reaction occurred and the flask was cooled to maintain the temperature at 30–40°C. After addition, the reaction mixture (pasty) was refluxed for about 3 hours. The mixture was cooled and hydrolyzed with 10% hydrochloric acid. The benzene solution was separated and the aqueous phase was washed with three 200 ml. portions of ether. The combined benzene solution and ether extracts were washed with water and sodium bicarbonate solution and dried over anhydrous $Na_2SO_4$.

The solution was filtered and ether-benzene was stripped off. The residue was simply distilled under reduced pressure. A product was collected (B.P. 123–125° C. at 0.5 mm., wt. 17.0 g.) which solidified on standing. Residue=3.2 g.

Infrared analysis showed a broad OH band at about 3300 cm.$^{-1}$ and no carbonyl band at 1740 cm.$^{-1}$. G.C. analysis showed product to be 93% pure trans-1,2-cyclohexanedimethanol.

A number of additional runs were made using benzene solutions of PMDT in various mole ratios to $LiAlH_4$, TMED as the chelating agent and hexahydrophthalic anhydride instead of diethyl hexahydrophthalate as the substance to be reduced. The data from these experiments are summarized in Table VIII. Reaction times varied from two to 18 hours, but even a reaction time of 2 hours is probably unnecessary. Reduction appeared to be complete within minutes.

In contrast to the results summarized in Table VIII, reduction of diethyl hexahydrophthalate or hexahydrophthalic anhydride with excess $LiAlH_4$ by conventional procedures in ether solvents gave impure glycol in very low yield only after extended reaction times.

Clearly, chelated $LiAlH_4$ in benzene is a far superior reducing agent to $LiAlH_4$ in ether solvents. Yields are higher, incomplete reductions are avoided and reaction times are an order of magnitude or more shorter.

TABLE VIII

| Run | Chelating agent and mole ratio to $LiAlH_4$ | Reaction time, hrs. | Chel.$LiAlH_4$ preformed | Compound reduced, g. (moles) | $LiAlH_4$ g. | Yield of distilled product, percent | Percent of purity of product |
|---|---|---|---|---|---|---|---|
| 1 | PMDT 1:1 | 3 | Yes | Diester 45.5 (0.2) | 8.0 | 59 | 93 |
| 2 | PMDT 1:1 | 3 | Yes | Anhydride 30.8 (0.2) | 8.0 | 28 | 93 |
| 3 | PMDT 0.25:1 | 4 | No | Anhydride 77 (0.5) | 21.8 | 30 | 91 |
| 4 | PMDT 0.5:1 | 4 | No | do | 21.8 | 34 | 90 |
| 5 | PMDT 0.75:1 | 4 | No | do | 21.8 | 38 | 91 |
| 6 | PMDT 1:1 | 4 | No | do | 21.8 | 29 | 88 |
| 7 | TMED 1:1 | 4 | No | do | 21.8 | 39 | 90 |
| 8 | TMED 1:1 | 2 | No | Diester 2,215 (9.7) | 424.2 | 81 | 96 |
| 9 | None [a] | 24 | | Diester 2,652 (11.6) | 445 | 30 | [b] 89 |

[a] Solvent:diethyl ether rather than benzene.
[b] Runs 1–8 distilled in simple one-plate column; run 9 distilled in 45-plate spinning band column.

EXAMPLE 22

0.1901, g. (4.5 mmole) LiCl was mixed with 0.6734 g. (4.5 mmole) NaI and to the anhydrous salt mixture was added 3 ml. (~15 mmole) of trans-TMCHD and the whole was allowed to stand at room temperature for 3 days. To the slurry was added 5 ml. of benzene with stirring. After two more days, the mixture was filtered and the solid was washed with two 4 ml. portions of benzene. The solid was then thoroughly dried, yield: 0.675 g.

The above filtrate was analyzed for chlorine and iodine and was found to contain 1.8 mmole Cl and 1.5 mmole I. In addition, the filtrate was analyzed for lithium and sodium and was found to contain 3.6 mmole Li and no sodium.

The above results demonstrate that organic lithium salt chelates may be prepared by anion exchange reactions because the only way that iodine could occur in the above filtrate in the absence of sodium is if the following reaction took place:

$$\text{Chel}\cdot\text{LiCl}+\text{NaI}\rightarrow\text{Chel}\cdot\text{LiI}+\text{NaCl}$$

Secondly, the above data show that lithium salts may be separated from sodium salts by contacting a salt mixture with a hydrocarbon solution of the proper chelating Lewis base.

Thirdly, the above results demonstrate that halogens may be recovered from salt mixtures with the aid of lithium salts and hydrocarbon solutions of chelating Lewis bases. By choice of the proper chelating agent and reaction conditions, e.g. temperature, such a process may be made highly selective for a particular halide ion, e.g. iodide ion.

EXAMPLE 23

0.2 g. (4 mmole) of $LiN_3$ was dispersed in 5 ml. of benzene and 0.7 g. (4 mmole) of pentamethyldiethylenetriamine was added with stirring. The solid swelled to many times its original volume and the infrared spectrum of the benzene solution contained a strong absorption at 2055 cm.$^{-1}$ characteristic of the azide ion. Analysis of the benzene solution for lithium showed that $$\text{PMDT}\cdot\text{LiN}_3$$

has a solubility of 0.1 molar at 25°C.

In a second experiment 0.24 g. (5 mmole) of $LiN_3$ and 1.15 g. (5 mmole) of hexamethyltriethylenetetramine (HMTT) were mixed in 5 ml. of benzene. The solid again swelled considerably but a homogeneous solution was not obtained. However, addition of 0.49 g. (5 mmole) of triethylboron to the reaction mixture resulted in very rapid solution of the solid giving a clear homogeneous solution (1 molar in complex). Therefore, specific anion solvating agents or complexing agents can increase solubility and enhance stability of the chelated lithium salts. New complex anions may be made in this manner.

While the above examples illustrate the invention in great detail, it should be understood that the present invention in its broadest aspect is not necessarily limited to the specific materials conditions and procedures shown therein. The present invention is limited only by the claims which will follow.

What is claimed is:

1. A complex comprising: (a) an inorganic lithium salt having a lattice energy less than 210 kilocalories per mole at 18°C., and (b) a monomeric or polymeric polyfunctional chelating tertiary hydrocarbyl amine containing at least two nitrogen atoms. [atoms and at least 2 tertiary nitrogen atoms.]

2. A complex according to claim 1 wherein the amines are chelating polyfunctional Lewis bases, said bases being ones selected from the group consisting of [tri] tris-(2-$C_1$–$C_4$ dialkylaminoethyl)-amine and those compounds having the formulas:

(I)

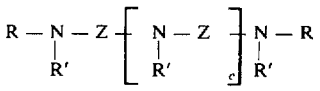

(II)

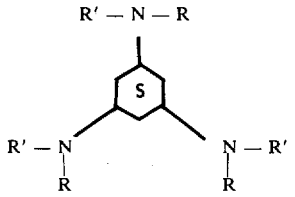

wherein c is an integer of 0 to 10,000 inclusive; R is the same or different $C_1$–$C_4$ alkyl radical; R′ is the same or different $C_1$–$C_4$ alkyl radical or $C_6$–$C_{10}$ aryl or aralkyl radical; and Z is a nonreactive radical selected from the group consisting of: (1) $C_4$–$C_{10}$ cycloaliphatic or aromatic radicals and their lower alkyl derivatives wherein said radicals are attached to the N atoms in Formula I *at* 1,2-*positions on the aromatic rings or* 1,2- *or* 1,3-*positions on the cycloaliphatic rings*; and (2) 1 to 4 methylenic radicals, wherein each methylenic radical contains 0 to 2 monovalent hydrocarbon radicals of 1 to 6 carbon atoms.

3. A complex according to claim 2 wherein the chelating tertiary hydrocarbyl amine contains at least 5 carbon *atoms and at least* 2 *tertiary nitrogen atoms.*

4. The chelated complex of claim 3 wherein all of the R groups are methyl.

5. A complex according to claim 1 wherein the Lewis base is N,N,N′, N′-tetramethyl-1,6-hexanediamine.

6. A chelated complex according to claim 2 in which the chelating hydrocarbyl amine is N,N,N′, N′-tetramethyl-1,2-ethanediamine.

7. The chelated complex of claim 2 in which the chelating Lewis base is N,N,N′, N″-pentamethyl diethylenetriamine.

8. The chelated complex of claim 2 in which the chelating Lewis base is N,N,N′, N″, N‴, N‴-hexamethyl triethylenetetramine.

9. The chelated complex of claim 2 in which the chelating Lewis base is [tri] *tris-* (2-dimethylaminoethyl)amine.

10. The chelated complex of claim 2 in which the chelating Lewis base is [*both*] *either* cis [and] *or* trans-N,N,N′, N′-tetramethyl-1,2-cyclohexanediamine [.] *or mixtures thereof.*

11. A chelated complex according to claim 2 in which the anion of the lithium salt is selected from the group consisting of chloride, bromide, iodide, borohydride, nitrate, hexafluorophosphate, tetrafluoroborate, tetraphenylborate, perchlorate and tetrafluoroberyllate.

* * * * *